United States Patent [19]

Das

[11] Patent Number: 5,130,385

[45] Date of Patent: * Jul. 14, 1992

[54] CYANATO GROUP CONTAINING PHENOLIC RESINS, AND PHENOLIC TRIAZINES DERIVED THEREFROM

[75] Inventor: Sajal Das, Sommerset, N.J.

[73] Assignee: Allied-Signal Inc., Morristown, N.J.

[*] Notice: The portion of the term of this patent subsequent to May 16, 2006 has been disclaimed.

[21] Appl. No.: 582,050

[22] Filed: Sep. 14, 1990

Related U.S. Application Data

[63] Continuation-in-part of Ser. No. 271,198, Jan. 15, 1988, Pat. No. 4,978,727, which is a continuation-in-part of Ser. No. 41,018, Mar. 23, 1987, abandoned, which is a continuation-in-part of Ser. No. 821,658, Jan. 23, 1986, abandoned, which is a continuation-in-part of Ser. No. 104,700, Oct. 5, 1989, Pat. No. 4,831,086.

[51] Int. Cl.$^5$ .......................... C08G 8/28; C08L 61/06
[52] U.S. Cl. .................... 525/504; 528/162; 525/471
[58] Field of Search .................. 525/504; 528/162

[56] References Cited

U.S. PATENT DOCUMENTS

| | | | |
|---|---|---|---|
| 3,444,137 | 5/1969 | Higginbottom et al. | 525/504 |
| 3,448,079 | 6/1969 | Grigat et al. | 525/504 |
| 3,890,272 | 6/1975 | D'Alelio | 528/162 |
| 3,929,713 | 12/1975 | D'Alelio | 528/162 |
| 3,966,670 | 6/1976 | Grazen et al. | 528/129 |
| 4,022,755 | 5/1977 | Tanigaichi et al. | 525/504 |
| 4,096,108 | 6/1978 | Webb et al. | 528/129 |
| 4,118,377 | 10/1978 | D'Alelio | 528/162 |
| 4,157,360 | 5/1979 | Prevorsek et al. | 528/125 |
| 4,218,361 | 8/1980 | Searjean et al. | 528/129 |
| 4,219,452 | 8/1980 | Littlefield | 528/129 |
| 4,268,657 | 5/1981 | Manzara et al. | 528/129 |
| 4,281,361 | 7/1981 | Patz et al. | 528/129 |
| 4,477,629 | 10/1984 | Hefner | 528/99 |
| 4,487,915 | 12/1984 | Hefner | 528/96 |
| 4,528,366 | 7/1985 | Woo et al. | 528/422 |
| 4,713,442 | 12/1987 | Woo et al. | 528/422 |
| 4,831,086 | 5/1989 | Das et al. | 525/504 |

FOREIGN PATENT DOCUMENTS

| | | |
|---|---|---|
| 147548 | 7/1985 | European Pat. Off. . |
| 1720740 | 9/1971 | Fed. Rep. of Germany . |
| 58-34822 | 3/1983 | Japan . |
| 59-149918 | 8/1984 | Japan . |
| 1174654 | 8/1986 | Japan . |
| 85/03713 | 8/1985 | World Int. Prop. O. . |
| 87/04443 | 7/1987 | World Int. Prop. O. . |

*Primary Examiner*—John C. Bleutge
*Assistant Examiner*—Frederick Krass
*Attorney, Agent, or Firm*—R. C. Stewart, II; G. H. Fuchs; D. L. Webster

[57] ABSTRACT

The present invention is a cyanato group containing phenolic resin, and to phenolic triazine resins derived therefrom. The cyanato group containing phenolic resin of the present invention can be completely cured to form a phenolic triazine resin having a glass transition temperature equal to or greater than 250° C.

37 Claims, No Drawings

CYANATO GROUP CONTAINING PHENOLIC RESINS, AND PHENOLIC TRIAZINES DERIVED THEREFROM

BACKGROUND OF THE INVENTION

This application is a continuation-in-part application of U.S. patent application Ser. No. 271,198 filed Jan. 15, 1988, now U.S. Pat. No. 4,978,727, which is a continuation-in-part application of U.S. patent application Ser. No. 041,018 filed Mar. 23, 1987 claiming priority of U.S. Pat. No. 87/00123 filed Jan. 15, 1987, the former now abandoned, which is a continuation-in-part of U.S. patent application Ser. No. 821,658, filed Jan. 23, 1986, now abandoned; and U.S. Patent Ser. No. 104,700 filed on October 5, 1987 now U.S. Pat. No. 4,831,086.

1. FIELD OF THE INVENTION

This invention relates to certain novel cyanato group containing phenolic resins, also known as phenolic cyanato resin and to a process of preparing same. More particularly, this invention relates to such resins which have improved properties and to a Process for preparing such resins.

2. PRIOR ART

Phenolic resins are a class of synthetic materials that have grown continuously in terms of volume and applications for over several decades. The building blocks used in greatest volume are phenol and formaldehyde. Other important phenolic starting materials are the alkyl-substituted phenols, including cresols, xylenols, p-tert-butyl-phenol, p-phenylphenol, and nonylphenol. Diphenols, e.g., resorcinol (1,3-benzenediol) and bis-phenol-A [bis-A or 2,2-bis(4-hydroxylphenyl)propane], are employed in smaller quantities for applications requiring special properties. In addition to formaldehyde, acetaldehyde or furfuraldehyde sometimes are employed but in much smaller quantities. The greater latitude in molecular structure, which is provided by varying the raw materials, chemistry, and manufacturing process, has made possible an extremely large number of applications for these products as a result of the array of physical properties that arise from the synthetic options.

The early investigation of the reaction of phenol and formaldehyde began with the work of von Baeyer and others in the early 1870's as an extension of phenol based dye chemistry. The initial experiments result in soluble, amorphous products whose properties elicited little interest. Insoluble, cross-linked products also were reported in the late 1880 s, but these products also were not perceived as useful materials. In 1888, the first patent for a phenolic-resin product intended for use as a hard-rubber substitute was granted. The first commercial product was introduced as a shellac substitute by the Louis Bluner Company in the early 1900's. Process patents were issued in 1894 and 1895 for ortho- and paramethylolphenol, respectively.

Key innovations in early phenolic-resin manufacture included control of the molecular structure and the use of heat and pressure to achieve desirable physical properties in filled compositions. Studies in the use of acidic or basic catalysts and of changes in the molar ratio of formaldehyde to phenol resulted in the definition of two classes of polymeric materials which are referred to as Bakelite resins. Caustic-catalyzed products, which are prepared with greater than a 1:1 mol ratio of formaldehyde to phenol, can be used to form cross-linked, insoluble, and infusible compositions in a controlled fashion. With less than a 1:1 mol ratio of formaldehyde to phenol, the resultant products remain soluble; furthermore, acid catalysis yields permanently stable compositions, whereas base-catalyzed materials can be advanced in molecular weight and viscosity Possibly of greatest importance to early commercialization, however, was the reduction to practice of the use of heat and pressure to produce essentially void-free molding compositions.

Resole resins are made with an alkaline catalyst and a molar excess of formaldehyde. Novolak or novolac resins are prepared with an acid catalyst and less than one mol of formaldehyde per mol of phenol. The initial reaction involved in the preparation of resolated novolacs is carried out with an acid catalyst and less than a 1:1 mol ratio of formaldehyde to phenol. After formation of the novolac, the pH is adjusted so that the reaction mixture is basic and additional formaldehyde is added. Resoles and resolated novolaks are inherently thermosetting and require no curing agent for advancement. Novolacs, by comparison, are thermoplastic and require the addition of a curing agent, the most common being either hexamethylene-tetramine or a resole. The stages of molecular weight advancement are characterized by liquid or solid phenolic polymer which is soluble in certain organic solvents and is fusible; solid resin which is insoluble but swelled by organic solvents and, although softened by heat, exhibits essentially no flow; and an insoluble, infusible product which is not swelled by solvents nor softened by heat, i.e., the system is in a highly cross-linked state.

Phenolic resins have many uses. For example, such materials are used as bonding agents in friction materials such as brake linings, clutch facings, transmission bonds and the like. For example, U.S. Pat. Nos. 4,268,157; 4,069,108; 4,268,657; 4,218,361; 4,219,452 and 3,966,670 describe various friction materials in which a phenolic resin is employed as the bonding agent. Phenolics are also used as molding materials, and as coatings and adhesives. Phenolic resins developed for non-flammability and long-term temperature stability to 230° C. have been studied in a carbon-fiber composites. Potential for such composites lies in advanced aircraft application.

While present day phenolics exhibit several beneficial properties, they suffer from a number of disadvantages which restrict their utility. For example, such materials exhibit less than desirable thermal oxidative stability. Other major problems of present day phenolic technology include a need for auxiliary chemicals such as hexamethylenetetramine to crosslink the phenolic which often results in the production of volatile by-products such as ammonia during crosslinking is often extensive and is not controllable.

Various modifications to phenolics have been proposed to obviate certain of the disadvantages attendant to these resins. For example, epich orohydirn has been reacted with the hydroxyl groups of novolac to form the corresponding form methylon resin.

Japanese Patent Publications Nos. 59-149918, and 58-34822 describe a method of preparing a phenolic resin containing cyanato groups. In this method. a trialkyl ammonium salt of a phenol novolak is reacted with excess cyano halogen in an organic solvent such as methylene chloride. The ammonium by-product salt is separated from the reaction mixture by extraction with water. Several disadvantages are attendant to the process of these references. The reaction is limited to being conducted in a water immiscible solvent. As a result it is suitable only for cyanation of low molecular weight novolac resin below 320 Mn. We have found that the method disclosed in these references results in a phenolic cyanato resin which release smoke (volatiles) during curing at 155° C. or above.

U.S. Pat. No. 3,448,079 describes aromatic cyanic acid esters produced by the reaction of phenolic resins with cyanogen halide in which the hydroxyl groups of the phenol-formaldehyde resins are replaced with cyanic acid ester groups, and process for producing same. U.S. Pat. No. 3,444,137 describes curable phenol-aldehyde resins characterized by molecules which contain a cyano group, an amine nitrogen atom, a phenyl group and a substituted hydroxyl group, such molecules having been made by reacting a phenol, formaldehyde and a cyano substituted primary or secondary amine. U.S. Patent No. 4,022,755 describes cyanato-group containing phenol resins, and a process for preparing same. U.S. Pat. No. 4,713,442 discloses a polytriazine which comprises 1,3,5-triaryloxytriazines. Polyaromatic cyanates are also disclosed in EPA 0 147 548, WO 85/03713 and GB-A-1218447.

Cyanato group containing phenolic resins have been described in Delano, et al., *Synthesis of Improved Phenolic Resins*, Acurex Corp./Aerotherm, Acurex Vinyl Report 79-25/AS, Sep. 4, 1979, prepared for NASA Lewis Research Center, Contract No. Nas3-21368, and is available through the United States Department of Commerce National Technical Information Service.

A recent reference, "Heat Resistance Polymers" by Critchley, et al., pp. 406–408, Plenum Press, New York,, 1986, has described phenolic triazine resins prepared from phenolic novolac or meta-cesol novolac which have essentially the same chemical structures as described in the above referenced patents.

SUMMARY OF THE INVENTION

The present invention is directed to a modified phenolic cyanato resin comprising a mixture of polymers of the Formula:

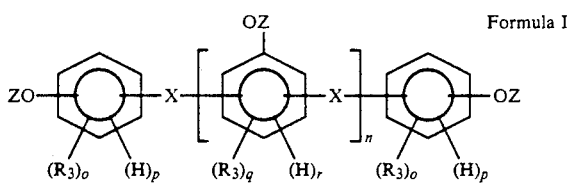

Formula I wherein: n is 0 or a positive whole number greater than or equal to 1.

q and r are the same or different at each occurrence and are whole numbers from 0 to 3, with the proviso that the sum of q and r at each occurrence is equal to 3;

—Z is —O( R )$_y$— CN or —OH and —O( R )$_y$CN;

y is the same or different at each occurrence and is 0 or 1, preferably 0;

o and p are the same or different at each occurrence and are whole numbers from 0 to 4 with the Proviso that the sum of o and p at each occurrence is equal to 4;

—X— and —R— are the same or different and are divalent organic radicals; and $R_3$ is the same or different at each occurrence and is a substituent other than hydrogen;

said mixture containing less than 50% by weight in total polymers having the Formula I in which n is an integer of 1 to 3, and wherein the completely cured product of said resin exhibits a glass transition temperature equal to or greater than about 250° C.

As used herein, a "mixture" is a composition containing two or more polymers of the Formula I having different values of n.

Precured compositions can be made containing the modified phenolic resin of Formula I, and to cured, partially cured, completely cured and incompletely cured compositions formed by "cyclotrimerization" of the cyano group of the modified phenolic resin of Formula I to varying degrees and such compositions formed by reaction of the cyano groups modified resin of Formula I with a suitable bismaleimide to varying degrees. As used herein, "completely cured" modified phenolic resins are those in which less than about 20 mole percent of the original cyano groups remain unreacted, i.e. uncyclotrimerized, as determined by the method of infrared spectrophotometry; "precured" modified phenolic resins are those in which substantially about 100 mole percent of the original cyano groups are unreacted, i.e. uncyclotrimerized, as determined by the method of infrared spectrophotometry; "partially cured" modified phenolic resins are those in which from about 40 to about 80 mole percent of the original cyano groups are unreacted, i.e. uncyclotrimerized, as determined by infrared spectrophotometry; and "incompletely cured" modified Phenolic resins are those in which from about 20 up to about 40 mole percent of the original cyano groups are unreacted i.e. uncyclotrimerized, as determined by infrared spectrophotometry.

Still, another aspect of this invention relates to precured, partially cured, incompletely cured and completely cured compositions comprising said phenolic resin in admixture with one or more other materials as for example, blends with one or more thermosetting and thermoplastic polymers such as epoxies, phenolics, polyamides, polycarbonates, polyolefins , polyesters, alkyds, polysulfones, polyetherether ketones, polyphenylene sulfides, polybenzaimidiazoles, polyindanes and the like and/or filled compositions with particulate and fibrous inorganic or organic fillers as for example asbestos, mica, boron, talc, carbon, and the like.

The resin of the present invention is processable using conventional plastic processing equipment and has a relatively long shelf life. This is indicated by the gel time of greater than about 1 minute, preferably greater than about 2 minutes, more preferably greater than 10 minutes and most preferably greater than about 20 minutes at 155° C. This is also indicated by relatively superior "shelf life" of at least about 4 days, preferably of at least about 10 days, more preferably of at least about 20 days and most preferably of at least about 50 days. As used herein, "shelf life" is the period over which a 20 gram sample of the resin can be stored at a temperature of about 20° C. without conversion of more than about 20 wt % of the resin based on the total weight of the stored resin (preferably not more than about 10%, more preferably not more than about 5% and most preferably not more than 2%) into components which are isoluble at about 20° C. in a 100 g sample of tetrahydrofuran.

The improved phenolic cyanato resin of the present invention can be completely cured in a cyclotrimerization reaction to form a completely cured phenolic triazine having relatively high thermal stability as indicated by thermal decomposition temperature of at least about 400° C. and preferably of at least about 450° C. as measured by Thermal Gravimetric Analysis (TGA) and having enhanced char yield of at least about 50 wgt % based on the total weight of the phenolic triazine, preferably from about 50 wgt % to about 10 wgt % and more preferably from about 60 to about 70 wgt %, also as measured by Thermal Gravimetric Analysis (TGA). The completely cured resin exhibits outstanding glass transition temperature of at least about 250° C., preferably to at least about 300° C. and more Preferably at least about 350° C. as measured by Dynamic Mechanical Analysis. (See the examples)

The cured resin derived from modified phenolic resin of this invention, and the modified phenolic resin of this invention exhibit several advantages over conventional phenolic resins. For example, certain of these materials are self crosslinking, and thus do not require auxilliary chemical for crosslinking. Moreover, the cross-linked, i.e. cured, resins of this invention have excellent oxidative, mechanical and thermal stability, and no volatile, potentially environmentally hazardous by-products are produced during crosslinking.

DESCRIPTION OF THE PREFERRED EMBODIMENTS

One aspect of this invention relates to a phenolic cyanato having relatively enhanced shelf life of the formula:

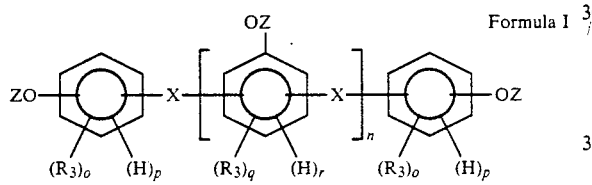

Formula I wherein $R_3$, n, q, r, o, p, X and Z are as described above.

In the structure of Formula I, $R_3$ is a substituent other than hydrogen. Illustrative of suitable $R_3$ groups are such inert substituents as halogen, trihalomethyl, alkyl, alkoxy, phenyl and the like. Suitable $R_3$ substituents also include reactive substituents as for example substituents which may become involved in crosslinking reactions such as cyano, cyanato, hydroxy, alkynyloxy, and the like.

In the phenolic cyanato, —X— is a divalent organic radical. Illustrative of suitable —X— groups are substituted or unsubstituted alkylene such as methylene, ethylemthylene, 2-ethylpentylmethylene, methylmethylene, isopropylmethylene, isobutylmethylene, pentylmethylene, and furylmethylene, perfluoromethylene, perchloromethylene and the like; substituted and unsubstituted arylenes such as 1,3-benzenedimethylene, phenylmethylene, 1,4-benzenedimethylene, 2,2-bis-(4-phenylene)propane, 4-methoxyphenylmethylene, bis-(4-phenylene)methane, 1,3-(4-chlorobenzene)dimethylene), 4,4-diphenylene dimethylethane; and cycloalkylenes such as cyclohexylene, cyclooctylene, and 1,3-cyclohexanedimethylene, and the like.

Z is —O—(R)$_y$CN or —OH and —O—(R)$_y$CN. Useful —R— functions include divalent organic radicals selected from the group consisting of (a) divalent aromatic hydrocarbon radicals having from about 6 to about 20 carbon atoms and halogenated derivatives thereof as for example phenylene, (b) divalent alkylene radicals and cycloalkylene radicals having from about 2 to about 20 carbon atoms, and (c) divalent polydiorganosiloxanes terminated with alkylene having from about 2 to about 8 carbon atoms.

Preferred for use in the practice of this invention are those embodiments in which:

—Z is the same or different at each occurrence and is —O(R)$_y$CN or —OH and —O(R)$_y$CN where from about 20 to about 100 mole percent of the Z moieties are —OCN;

—X— is the same or different at each occurrence and is substituted or unsubstituted methylene or aryldialkylene, wherein permissible substituents are benzene, furyl, halogen, alkyl or cycloalkyl, or —X— is a moiety of the formula —SO$_2$—,—S—,—S—S—,—SO—, —C(O)O—,OC(O)—, —O— or —C(O)—;

q and r are the same or different at each occurrence and are positive whole numbers from 0 to 3, with the proviso that the sum of q and r is 3;

—R— is the same or different at each occurrence and is selected from the group consisting of divalent aromatic, divalent hydrocarbon radicals having from about 1 to about 20 carbon atoms and halogenated derivatives thereof, and divalent alkylene or cycloalkylene radicals preferably alkylene;

y is 0 or 1;

$R_3$ is the same or different at each occurrence and is alkyl, halogen, cyano, hydroxy, cyanato, isocyanate or alkynyloxy;

n is 0 or a positive number from 1 to about 10; and o and p are the same or different at each occurrence and are positive whole numbers from 0 to 4, with the proviso that the sum of o and p is 4.

Amongst the preferred embodiments, particularly preferred are those embodiments of above Formula I in which:

—Z is the same or different at each occurrence and is —OCN or —OH and —OCN, with the proviso that from about 50 to about 100 mole % of —Z is —OCN based on the total moles of —Z;

—X— is substituted or unsubstituted methylene wherein permissible substituents are alkyl having from 1 to about 10 carbon atoms, benzene, halogen or furfuryl, xylene,—OC(O), —C(O)—, —SO$_2$—, —O—, or —C(O)O—;

$R_3$ is alkyl, halogen, cyano, alkynylene, cyanato, alkoxy, or alkynyloxy;

o is 0 or 1;

p is 0 or 1;

n is from about 0 or a positive whole number from 1 to about 8;

q is 0 or 1;

r is 1 to 3; and p is 1 to 4.

The most preferred embodiments of the invention are those embodiments wherein:

n is 0 or a positive whole number from 1 to about 6;

—Z is the same or different at each occurrence and is —OCN or —OH and —OCN, with the proviso that from about 80 to about 100 mole percent of —Z moieties based on the total moles of —Z are —OCN with those polymers in which 100 mole % of —Z is —OCN or about 100 mole % of —Z is —OCN being the embodiments of choice;

q is 0;

o is 0; and

—X—is methylene or methylene substituted with alkyl having 1 to about 10 carbon atoms, benzene, halogen or furfuryl, or is a moiety of the formula:

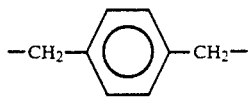

(with those embodiments in which —X— is methylene being the embodiments of choice);
r is 3; and
p is 4.

The phenolic cyanato of this invention can be completely cured to form a phenolic triazine which exhibits outstanding thermal properties. For example, the completely cured resin exhibits a glass transition temperature of at least about 250° C., preferably at least about 300° C., more preferably at least about 350° C. and most preferably at least about 375° C. as measured by Dynamic Mechanical analysis as described in Example 6 below. The completely cured resin also exhibits a thermal decomposition temperature of at least about 400° C. more preferably at least about 450° C. and most Preferably at least about 475° C., as measured by thermal Gravimetric Analysis (TGA). These properties are indeed surprising in view of the teachings of U.S. Pat. No. 4,022,755 that if the content of polymers in which n is an integer of 1 to 3 is less than 50% by weight, the resulting cyanato -group- containing phenol resins form cured Products inferior in thermal properties.

The cyanato group containing phenolic resin of the present invention results in satisfactory cured triazine materials regardless of number average molecular weight. The number average molecular weight of the polymer of this invention may vary widely. The term number average molecular weight Mn as used herein is defined as follows:

$$M_n = \frac{\sum_{i=1}^{\infty} M_i N_i}{\sum_{i=1}^{\infty} N_i}$$

wherein the summation:

$$M_n = \sum_{i=1}^{\infty} N_i$$

represents the total of molecules is a sample, N represents the number of molecules of molecular weight $M_i$ and the summation;

$$M_n = \sum_{i=1}^{\infty} M_i N_i$$

represent the total weight of the sample.

Preferred number average molecular weights of the cyanated phenolic resin are from about 275 to about 1400, more Preferred number average molecular weights are from about 400 to about 1000. Most preferred resins are those having number average molecular weights in the range of from about 500 to about 850.

In general, the mixture of polymers includes less than 50% by weight (of polymers in the mixture) of polymers in which n is integer of 1 to 3. The lower limit is not critical and can vary widely, from 0% by weight to any amount less than 50% by weight In the preferred embodiments of the invention, the mixture contains form about 10 to about 49% by weight of polymers in which n is an integer from 1 to 3, and in the more preferred embodiments of the invention the mixture contains from about 20 to about 45% by weight of polymers in which n is an integer from 1 to 3. In the most preferred embodiments of the invention, the mixture contains from about 25 to about 45% by weight of polymers in which n is an integer from 1 to 3, with those embodiments in which the mixture contains from about 30 to about 40% by weight being the embodiments of choice.

The molecular weight distribution, and the number average molecular weight of the resin can be determined by gel permeation chromatography (GPC) using tetrahydrofuran as the solvent.

The phenolic cyanato resin of the invention depicted in Formula I is prepared by a nucleophilic displacement reaction. In the first step of this reaction, a phenolic resin is reacted with a stoichiometric amount or a slight excess of a base to form a basic salt of the Formula III.

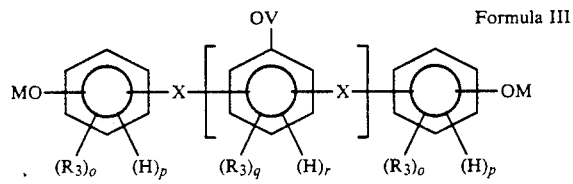

Formula III wherein $R_3$, —X—, q, o, p, r and n are as defined above, M is a cation and V is M or hydrogen, preferably under nitrogen in the presence of an aprotic solvent.

Reaction temperatures can vary widely in the first step. Preferred reaction temperatures are about −5° C., to about 120° C. with agitation and more preferably from about −5° C. to about −45° C.

Useful solvents can vary widely. The solvent is inert under the reaction conditions and is preferably an aprotic solvent. Illustration of solvents useful in the conduct of this reaction are N,N-dimethyl acetamide, N,N-dimethyl formamide, N-methyl-2 pyrrolidone, propyl carbonate, cyclohexane, oxylene, aprotic halocarbons such as carbon tetrachloride and methylene chloride, benzene, dimethyl sulfoxide, and ethers such as diglyme, cyclic ethers and mixtures thereof. Ethers and aprotic haloalkanes are preferred solvents, and cyclic ethers and mixtures thereof are most preferred solvents Most preferred cyclic ethers include tetrahydrofuran, 1,4-dioxane, and furan, with tetrahydrofuran being the solvent of choice.

The base employed may vary widely and includes organic bases such as amines and inorganic bases such as alkali metal and alkaline earth metal hydroxides. Preferred bases are amines, especially tertiary amines. Particularly preferred bases are trialkylamine such as triethylamine, tripropylamine and diethylcyclohexylamine.

Reaction times can vary considerably and will depend upon such factors as the degree of agitation, temperature, time, nature and proportion of reactants and the like. The reaction product can be recovered by conventional means. For example, the phenolic trialkylamine salt can be precipitate by pouring the reaction mixture into a non solvent vehicle. A non-solvent vehicle is defined to be a liquid medium in which the phenolic cyanato resin reaction product is insoluble and nonreactive. Preferred non solvent vehicles include alcohols, more preferably organic alcohols such as propanol, butanol, methanol, ethanol, glycol, polyglycol, with isopropanol being most preferred. The product can then be dried in vacuum over for 24 hours.

Any phenolic resin which can provide the desired trialkylammonium salt may be used. The trialkylammonium phenolic resin is preferably derived from a phenolic novolac. Useful phenolic novolac resins are known in the art. Typical and useful phenolic novolac resins are disclosed in U.S. Pat. No. 4,022,755 at column 2 beginning at line 27.

In the second step of the process, the basic salt is reacted with a moiety of the formula U -( R )$_y$ CN where U is halogen to form the cyanato group containing phenolic resin. The reaction is usually conducted at a temperature of below about $-5°$ C., preferably at a temperature of from about $-5°$ C. to $-45°$ C., more preferably from $-5°$ C. to $-30°$ C. and most preferably from $-15°$ C. to $-30°$ C.

The relative amounts of solvent, base and phenolic resin used should be controlled to control gel time of the cyanato group containing phenolic resin. Concentrations can be measured as a function of the weight percent of the basic salt which could be calculated based on the weight of the base, phenolic resin and solvent. Preferably, the amount of base salt is from about 5 to about 35, more preferably about 10 to about 25, and most preferably from 10 to 20 percent b weight. The preferred concentration can vary depending on the specific solvents and reactants used.

The product can be isolated using conventional procedures. The purification procedures should preferably avoid the use of temperatures in excess of about 0° C. In the more preferred embodiments of the invention, temperatures in excess of about $-5°$ C. are avoided in the isolation and purification of the produce, and in the most preferred embodiments temperatures in excess of about $-10°$ C. are avoided. The use of temperatures in excess of those specified above during the reaction, and processing and isolation step may result in the formation of an inferior product.

The partially cured, completely cured and incompletely cured phenolic triazine resins of this invention are formed by the polycyclotrimerization of the phenolic cyanato resin of Formula I.

By the term "polycyclotrimerization" is meant forming a cyanurate ring system by the chain extension polymerization of three aromatic cyanato groups to form the crosslinked triazine ring system which comprises the following basic repeat unit of the Formula II:

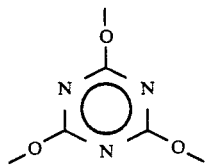

Formula II wherein the open valencies are bonded to a phenyl ring of a phenolic cyanato resin. The methods of conducting the polycyclotrimerization of cyanurate compounds are well known in the art, and include thermal annealing which can be conducted above about 125° C. For example, such methods are described in Kunststoffe, BD, 58, pp. 827-832 (1968), by R. Kubens et al. and Polk AK ad Nauk SSSR, vol. 202, pp. 347-350 (1972) by B. B. Korshak et al. and U.S. Pat. No. 4,157,360 which are hereby incorporated by reference.

The cyanato group containing phenolic resins forms a phenolic triazine network upon heating and/or in the presence of a curing agent. The threshold polymerization temperature can vary widely depending on a number of factors, as for example, time, and the presence or lack of a catalyst, the type of catalyst when used, and the like. In general, the threshold polymerization temperature depends on the level of substitution of $-O-(R)_y$ CN groups for $-OH$ groups in the original phenolic resin. For example, where all or substantially all of the $-OH$ groups are converted to $-O-(R)_y$ CN, and the gel time is greater than 20 minutes at 155° C., the threshold polymerization temperature is usually equal to or greater than about 150° C., and may be equal or greater than 175° C. Threshold polymerization temperature can be measured using a DuPont Model 9900 Differential Scanning Calorimeter. The threshold temperature is indicated by the onset of the curing exotherm. The peak indicates the maximum polymerization temperature. In the preferred embodiments of the invention, the polymerization or curing temperature is from about 100° C. to about 350° C., more preferably from about 100° C. to about 300° C., and most preferably 150° C. to 280° C. Among these particularly preferred embodiments, most preferred are those embodiments in which the polymerization temperature is from about 200° C. to about 250° C.

Useful curing pressures can vary widely. Usually curing pressures are from about 300 to about 500 psi for 5 minutes to 1 hour depending on sample size.

Heating can be accomplished by conventional methods known to those of skill in the art. Illustrations of such methods are heating with an oil bath, vacuum, hot air annealing, compression molding and the like.

The polymerization can be carried out in the presence of a catalytically effective amount of a catalyst. Useful catalyst can vary widely and include anhydrous metal salts such as stannous chloride dihydrate, cuprous bromide, cuprous cyanide, cuprous ferricyanide, zinc chloride, zinc bromide, zinc iodide, zinc cyanide, zinc ferrocyanide, zinc acetate, zinc octanoate silver chloride, ferrous chloride, nickel chloride, ferric chloride, cobaltous cyanide, nickel sulfate, stannic chloride, cobalt octanoate, nikel carbonate, and the like. Also useful as catalyst are proton-donating organic reducing agents such as tetrahydropyridine, hydroquinone, 4,4-biphenol and the like, and the catalyst described in U.S. Pat. Nos. 4,528,366 and 4,713,422. Zinc octanoate and cobalt octanoate are preferred catalyst.

Amounts of the catalyst when used can vary widely, provided that the amounts is sufficient to catalyze the reaction to the desired extent. Conventional catalytically effective amount of the catalyst are used. However, in the preferred embodiments of the invention the amount of catalyst employed in such that the amount of residual metal is less that about 1000 ppm based on the total parts of resin, preferably less than about 500 ppm, more preferably less than 100 ppm and most preferably less than about 10 ppm.

Reaction pressures are not critical and can vary widely. The reaction can be carried out at subatmospheric, atmospheric or super-atmospheric pressure. However, for convenience, the reaction is carried out at autogenous or atmospheric pressure.

A reinforced and/or filled compositions comprising the completely cured, partially cured, and incompletely cured phenolic triazine and/or phenolic cyanato polymers of this invention, as well as the compositions and blends which may be used in the preparation of such reinforced compositions are also part of the invention disclosed herein. The completely cured, precured, partially cured, and incompletely cured compositions as described, may contain fillers for use in where the structural strength and integrity of a structure has to be maintained, and for other purposes known to those of skill in the art. Any suitable filler known to those of skill in the art can be used. Such fillers may be selected from a wide variety of organic and inorganic materials such as polymers, minerals, metals, metal oxides, siliceous materials and metal salts. Illustrative of useful fillers are fiber glass, steel fibers, asbestos fibers, aramide fibers, boron fibers and carbon fibers, as well as plate like, fibrous and particulate forms of alumina, brass powder, aluminum hydrades, iron oxide, feldspar, lead oxides, asbestos, talc, barytes, calcium carbonates, clay, carbon black, quartz, novaculite and other forms of silica, koalinite, aluminum silicate, bentonite, garnet, mica, saponite, beidelite, calcium oxide, and fused silica, calcium hydroxide. Other useful fillers include chopped or continuous fibers formed from thermoplastic polymer, as for example, polyesters, polyolefins, polyamides, Polysulfones, polyaramids, polyester carbonates, polyethers, poly(phenylene sulfides), poly(benzaimidazoles), poly(etheretherketones) polyethersulfones, polycarbonates, polyamides, polyetherimides, polysulfides, polyacrylates, polyvinyls and the like; and thermosetting resins as for example phenolics, allylics, epoxies, unsaturated polyesters, alkyds and the like. The foregoing recited fillers are illustrative only and are not meant to limit the scope of the fillers that can be utilized in this invention. Methods for producing reinforced and/or filled compositions include melt blending, extrusion and molding processes, simple mixing and dispersion of both materials in suitable medium by methods known in the art.

This invention also relates to blends of the phenolic triazine polymers and/or Phenolic cyanato resin and one or more thermoplastic or thermosetting resins which may optionally include one or more particulate or fibrous fillers. Useful thermoplastic and thermosetting resins and useful fillers include those discussed above.

The phenolic cyanato polymer of this invention, completely cured, incompletely cured and partially-cured compositions of this invention are useful in forming a wide variety of industrial products, including shaped articles, as produced by known shaping processes. The phenolic cyanato polymer of this invention compositions can be formed (i.e., shaped) into articles which can then be cured to form completely cured, incompletely cured and partially-cured articles. Shaped articles produced from the polymer composition include windscreens such as wind shields, structural parts, canopies, door windows, wire housing and the like. The shaping process can be any process known to one skilled in the art, such as a resin transfer injection, blow or extrusion molding, and pultrusion and hot melt prepreg processing. Another use of the crosslinked polymer of the member is a binding agent in the manufacture of friction materials such as brake linings, clutch facings and transmission bands, as for example, those described in U.S. Pat. Nos. 3,996,670; 4,268,657; or 4,281,361. Still other uses of the copolymers of this invention are molding materials, composites for use in the manufacture of structural parts. Yet other copolymers of this invention are useful as adhesives.

In order that those skilled in the art will be better able to practice the invention, the following examples are give by way of illustration and not by way of limitation. In the examples, all parts are by weight unless otherwise noted.

EXAMPLE 1

A mixture of 102 g of novolac and 106 g of triethylamine was dissolved in 350 ml of methylene chloride at ambient temperature to from a triethylammonium salt of the novolac. Cyanogen bromide (102 g) was dissolved in 350 ml of methylene chloride. The solution containing the triethylammonium salt of the novolac was added slowly to the solution of cyanogen bromide. During the addition of novolac/triethylamine solution, the temperature was maintained at $-30°$ C. to $-50°$ C. After the addition of the salt solution was completed, the reaction mixture was stirred for an additional 15 minutes and the product was isolated by filtration to remove triethylammoniam hydrobromide salt. The cyanated phenolic resin was purified by extraction with water (three times). The methylene chloride was removed with a rotary evaporator at $40°$ C. under reduced pressure. The resulting Product was a viscous liquid. IR Spectra indicated the presence of C≡N groups. The GPC analysis of the cyanated product indicated that Mw was 1,049, Mn was 618 and Mw/Mn was 1.6972, and that the polymer fractions in which n was 1, 2 and 3 was 17.75%.

EXAMPLE 2

Bis (hydroxy phenyl) methane [BPF](2,2'-BPF was 18%, 2,4' BPF was 41.7% and 4,4' BPF was 40.3%) was dissolved in 200 grams of tetrahydrofuran. Triethylamine (51.8 g) was added to the BPF solution to form a phenolic salt. Cyanogen bromide (55.6 g) was dissolved in 200 gm of tetrahydrofuran and the temperature of the solution was lowered to $-60°$ C. to $50°$ C. The phenolic salt was added gradually (7 ml/min) to the cyanogen bromide solution. The temperature was kept at $-50°$ C. to $-60°$ C. during the entire addition period. After the addition, the reaction mixture was filtered and the triethylamine hydrobromide salt was collected by filtration. The filtrate was added to isopropanol which precipitated the cyanato product as gum. This gum was dissolved in methylene chloride and the methylene chloride solution extracted with water to remove impurities. The methylene chloride solvent was removed by rotary evaporation. Upon cooling, a red crystal mass resulted. GPC analysis showed 900 ppm of diethylcyanamide and phenyl cyanate and that Mw was 298, Mn was 278 and Mw/Mn was 1,0724. Polymer fractions in which n was 1, 2 and 3 was 12,38%.

EXAMPLE 3

Example 1 was repeated with novolac having number average molecular weight (Mn) of 362. GPC analysis of the cyanated novolac indicated that Mn was 656, Mw was 1,083, Mw/Mn was 1.6518 and that the polymer fraction in which n was 1, 2 and 3 was 25.69%

EXAMPLE 4

Example 1 was repeated with novolac having a number average molecular weight (Mn) of 358. The GPC analysis of the cyanated novolac indicated that Mn was 561, Mw was 1,055, Mw/Mn was 1.8789, and that the polymer fraction in which n was 1, 2, and 3 was 23.65%.

The cyanated product was a viscous liquid, having viscosity at 80° C. of 200 centipoise.

EXAMPLE 5

Example 1 was repeated, except the number average molecular weight (Mn) for the novolac was 358. GPS of the cyanated product indicated that: Mn was 681, Mw was 2,139 and Mw/Mn was 3.1410, and that the polymer fraction in which n is 1, 2, and 3 was 24.50%.

EXAMPLE 6

The glass transition temperatures (Tg) of completely cured gyanated phenolic resin of Example 1 to 4 were measured by Dyanmic Mechanical Analysis (DMA). In this procedure the resin was cured in a aluminum disc at 120° C. for 16 hrs followed by postcuring at a heating rate of 3° C./min up to a temperature of 260° C. The sample was held at 260° C. for 3 hrs. The molded plaques were cut from the sample. The plaques dimensions were length, 4 cm, width 1 cm and thickness was 0.25 cm.

To obtain the glass transition temperature (Tg), a Rheometrics Dynamic Spectrometer (RDS 7700 II) was used in the torsion/rectangular geometry to obtain shear modulus as a function of temperature conditions used were:

Frequency = 10 rad/se
Strain = 0.1%
Atmosphere = Inert

The data was recorded at 10° C. interval from room temperature to 450° C.

The shear modulus drop as function of temperature was taken as the glass transition temperature (Tg).

The glass transition (Tg) of cured resins is tabulated below in Table 1:

TABLE 1

| Sample | Tg (°C.) |
|---|---|
| Ex. 1 | 380 |
| Ex. 2 | 200 |
| Ex. 3 | 385 |
| Ex. 4 | 380 |

EXAMPLE 7

Using the resin of Example 2, a sample of the resin was cured as described in Example 6. The cured resin was then subjected to further post curing in which the cured resin was heated at a rate of 3° C./min. to a temperature of 260° C. and held at that temperature for 16 hrs. The transition temperature of the resin was measured using the procedure of Example 6 and was found to be 265° C.

EXAMPLE 8

A 50:50 by weight blend was made from cyanated novolacs A and B. The molecular weight and distribution (by GPC) of a and B are as follows:

Cyanated Novolac A:
Mn = 1,650
Mw = 4,180
Mw/Mn = 2.53
Polymer fraction when n is 1, 2, and 3 = 4.03

Cyanated Novolac B:
Mn = 590
Mw = 1,365
Mw/Mn = 2.31
Polymer fraction when n is 1, 2 and 3 = 31.79

The blending was performed using tetrahydrofuran as the solvent. A clear solution resulted and there was no phase separation upon blending. The resultant molecular weights of the blend (by GPC) are as follows:

Mn = 460
Mw = 1,200
Mw/Mn = 2.61
Polymer fraction when n is 1, 2 and 3 = 18.89

What is claimed is:

1. A phenolic cyanato resin comprising a mixture of polymers of the formula:

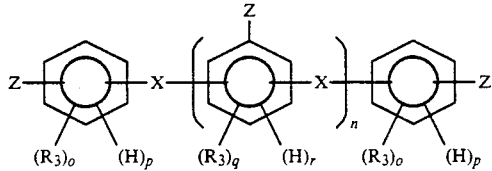

wherein: q and r are the same or different and are whole numbers from 0 to 3, with the proviso that the sum of q and r at each occurrence is equal to 3;

Z is $-O-(R)_y$ Cn, or a mixture of $-OH$ and $-O-(R)_y$ CN;

y is 0 or 1;

o and p are the same or different at each occurrence and are positive whole number from 0 to 4, with the proviso that the sum of o and p is equal to 4;

$-X-$ and $-R-$ are the same or different and are divalent radicals;

$R_3$ is the same or different at each occurrence and is a substituent other than hydrogen; and n is 0 or a positive whole number greater than or equal to 1;

wherein said mixture contains less than 50% by weight based on the total weight of polymers in the mixture of polymers wherein n is an integer of 1 to 3, wherein said resin forms a completely cured phenolic triazine having a glass transition temperature equal to or greater than about 265° C. and wherein on storage of a 20 gram sample of said resin for a period of at least about 4 days at a temperature of 20° C., no more than 5% by weight of said sample is converted into components which are insoluble at 20° C. in a 100 gram sample of tetrahydrofuran.

2. A resin according to claim 1 wherein y is o.

3. A resin according to claim 2 wherein said weight percent is from about 10 to about 49.

4. A resin according to claim 3 wherein said weight percent is from about 20 to about 49.

5. A resin according to claim 4 wherein said weight percent is from about 25 to about 35.

6. A resin according to claim 5 wherein said weight percent is from about 30 to about 40.

7. A resin according to claim 2 which has a number average molecular weight equal to or greater than about 275.

8. A resin according to claim 7 wherein said weight molecular weight is from about 400 to about 1000.

9. A resin according to claim 8 wherein said weight molecular weight is from about 340 to about 1000.

10. The resin of claim 9 having a molecular weight from about 500 to about 850.

11. A phenolic triazine resin derived from cyclo-trimezation of the cyanato group containing phenolic resin recited in claim 2.

12. A resin according to claim 2 wherein from about 20 to about 100 mole percent of Z are —OCN.

13. A resin according to claim 12 wherein from about 80 to about 100 mole percent of Z are —OCN.

14. A resin according to claim 2 wherein X is substituted or unsubstituted methylene or phenyldialkylene, wherein permissible substituents are alkyl groups having from 1 to about 10 carbon atoms, halogen, furyl, benzene, or X is a moiety of the formula:

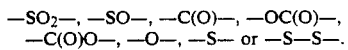

15. A resin according to claim 14 wherein —X— is methylene or methylene substituted with alkyl having 1 to about 10 carbon atoms, benzene, halogen or furyl, or is a moiety of the formula:

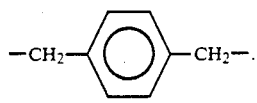

16. A resin according to claim 15 wherein —X— is methylene substituted with alkyl, halogen, benzene or furyl.

17. A resin according to claim 15 wherein —X— is methylene.

18. A resin according to claim 17 wherein o and q are 0; p is 4 and r is 3.

19. A resin according to claim 2 wherein n is from 1 to about 10.

20. A resin according to claim 19 wherein n is from about 1 to about 8.

21. A resin according to claim 20 wherein n is from 1 to about 5.

22. A resin according to claim 2 wherein:
o is 0 or 1; and
p is 2 or 4.

23. A resin according to claim 2 wherein:
q is 0 or 1; and
r is 2 or 3.

24. A resin according to claim 2 wherein $R_3$ is alkyl.

25. A resin according to claim 24 wherein $R_3$ is methyl.

26. A completely cured composition formed by cyclotrimerization of the composition of claim 1 or 2.

27. A partially cured composition formed by cyclotrimerization of the composition of claim 1 or 2.

28. An incompletely cured composition formed by cyclotrimerization of the composition of claim 1.

29. A resin according to claim 1 or 2 containing one or more fillers.

30. A resin blend comprising one or more cyanato resins of claim 1 and one or more thermoplastic or thermosetting resins.

31. A resin according to claim 29 comprising one or more fillers.

32. A resin according to claim 1 or 2 wherein said glass transition temperature is equal to or greater than about 300° C.

33. A resin according to claim 1 or 2 wherein said glass transition temperature is equal to or greater than about 350° C.

34. A resin according to claim 1 or 2 wherein said glass transition temperature is equal to or greater than about 380° C.

35. A resin according to claim 10 wherein:
$R_3$ is a alkyl;
—X— is methylene, furfuryl or a moiety of the formula:

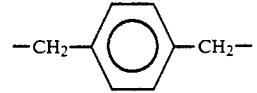

n is 0 or a positive whole number from 1 to about 6;
—Z— is the same or different at each occurrence and is —OCN, or —OH and —OCN, with the proviso that from about 80 to 100 mole percent of —Z moieties based on the total moles of —Z are —OCN;
y is zero;
r is 2 or 3; and
p is 3 or 4, wherein said resin forms a completely cured phenolic triazine having a glass transition temperature of at least about 300° C.

36. A resin according to claim 35 wherein:
o and q are 0;
r is 3; and
p is 4.

37. A resin according to claim 36 wherein —X— is methylene.

* * * * *